Oct. 15, 1940.     W. H. EVANS     2,218,380
CUTTING TOOL
Filed Sept. 20, 1937     4 Sheets-Sheet 4

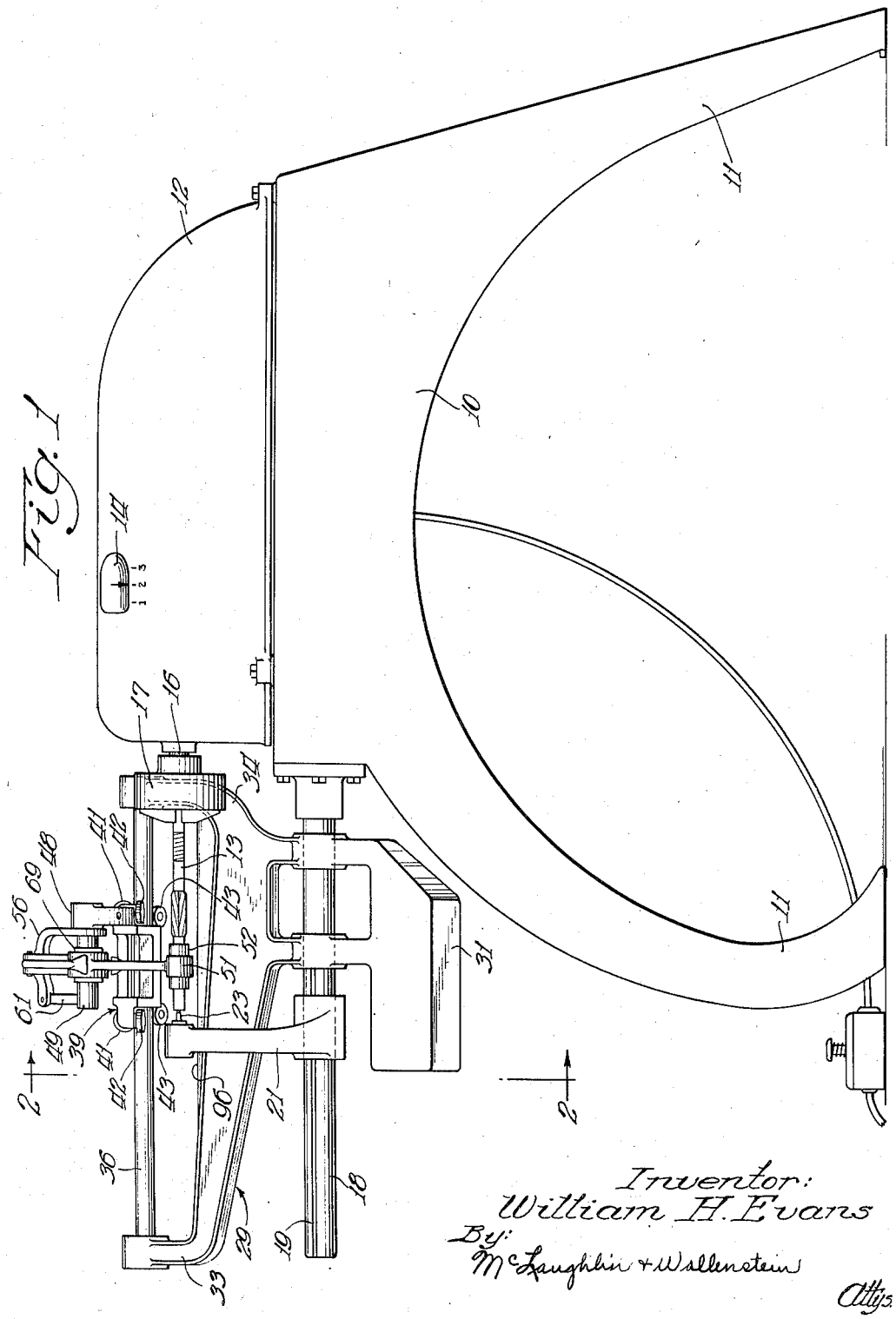

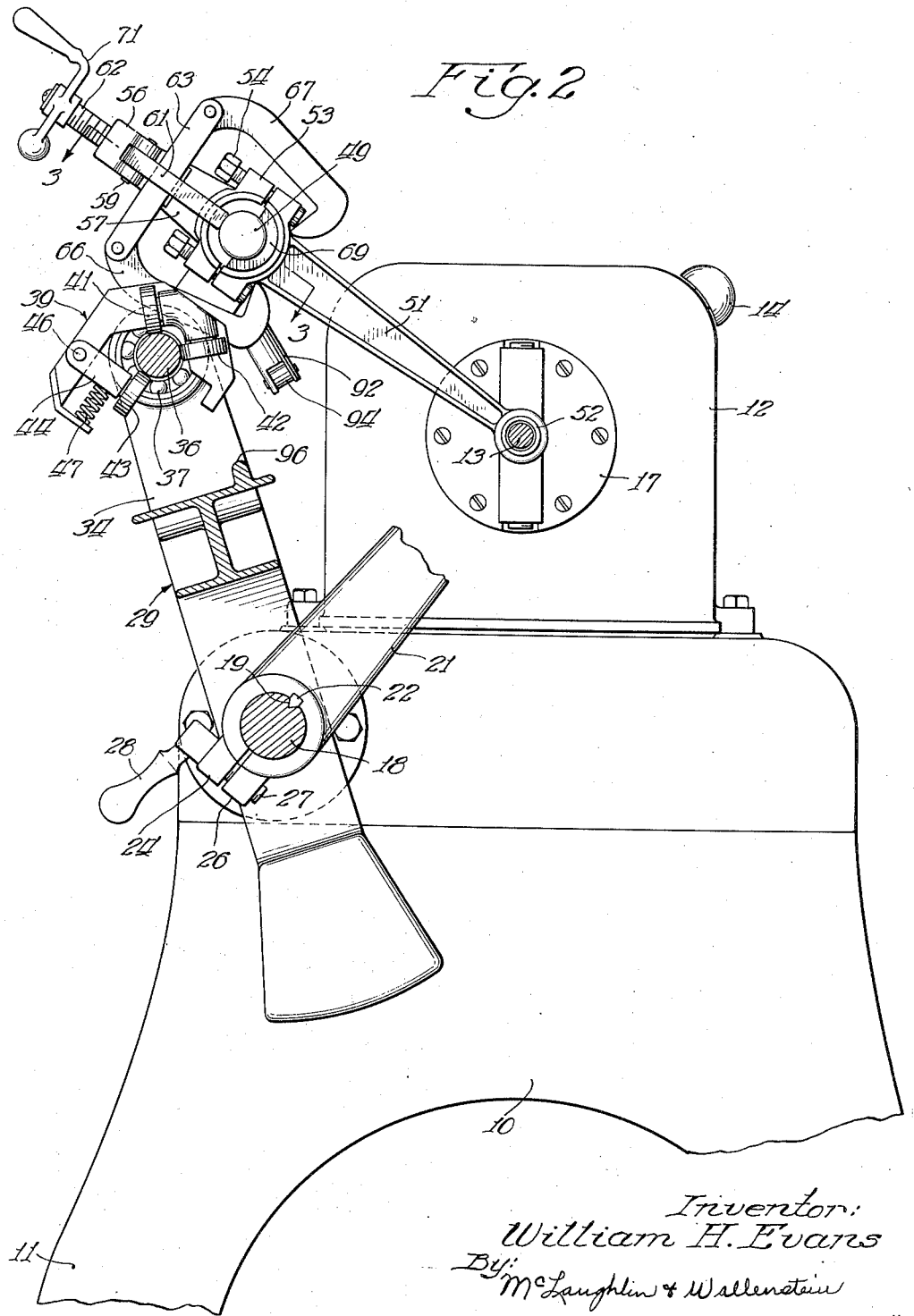

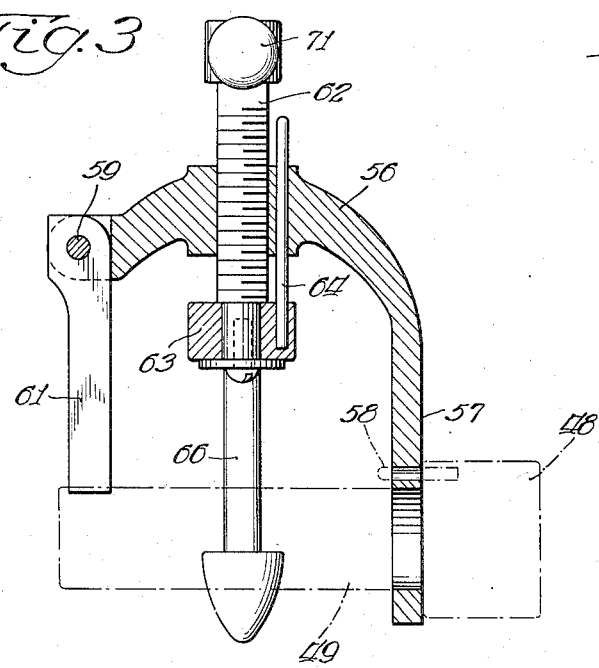
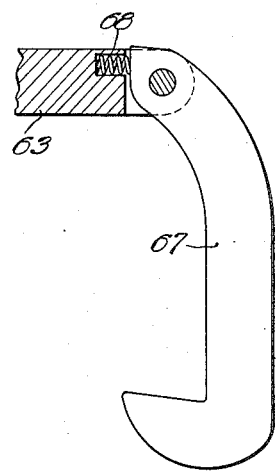
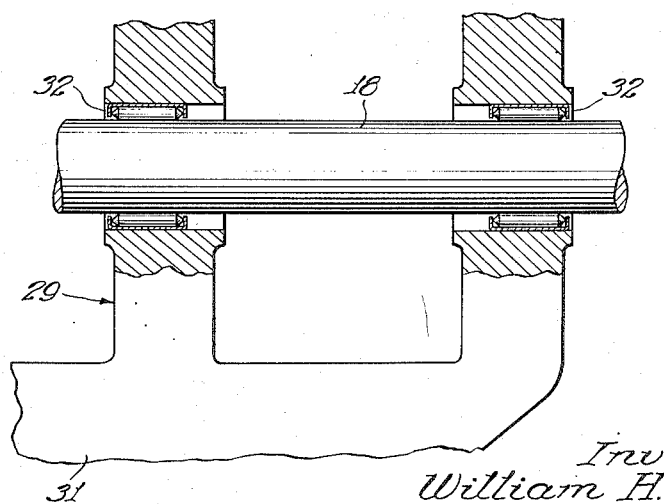

Inventor:
William H. Evans
By:
McLaughlin + Wallenstein
Attys.

Patented Oct. 15, 1940

2,218,380

UNITED STATES PATENT OFFICE 2,218,380

CUTTING TOOL

William H. Evans, Chicago, Ill.

Application September 20, 1937, Serial No. 164,677

9 Claims. (Cl. 77—3)

My invention relates to the operation of cutting tools, particularly of the reamer or boring tool type. It relates more specifically to the operation of reaming pistons and upper connecting rod bearings for the purpose of fitting piston pins or wrist pins thereto.

When piston pins or piston pin bearings become worn, the usual custom in the industries concerned with the operation of internal combustion engines is to refinish the upper connecting rod bearing and piston pin openings in the piston so as to receive an oversize piston pin which presumably will then give substantially the same operating life as the original installation. Those who have followed the automobile industry and other industries, however, are well aware that, after an internal combustion engine has been fitted with a new set of wrist pins or piston pins, it is very uncommon to get substantially the same line up of the new pins which is obtained when the pins are fitted at the factory in a new engine. Moreover, even though the internal combustion engine is in other respects placed in substantially as good condition as when new, the operating characteristics, after the fitting of new wrist pins, is usually not as satisfactory as could be desired.

The reason for the condition described is in great part due to the methods and apparatus employed heretofore for the fitting of oversize wrist pins. The custom has been to clamp the connecting rod and also the piston with a clamp mechanism for the purpose of enlarging and truing up the holes through which the new wrist pin is to be fitted. In this operation, ordinarily a reamer or similar cutting tool is employed, but, in any case, substantially the same way of supporting the connecting rod or piston has been employed. This system resulted in the newly finished piston pin openings generally following the same line as the worn openings, so that it was necessary, after the reaming or boring operation, to "jig" the connecting rod to line up the lower connecting rod bearing and upper piston pin bearing, that is to say, to place their axes in true parallel alignment. This involved bending the connecting rod more or less, thus introducing strains which would tend to be relieved after reassembly and result in throwing the piston pin bearings out of line. Furthermore, in the operation for bending the connecting rod, it has always been extremely difficult to get a true parallel alignment of the upper and lower bearings so that there will tend to be some disalignment even before assembly. Another difficulty is caused by the fact that even new connecting rods may contain strains which will tend to be relieved during engine operation, and there is no way of compensating for such a condition in the ordinary practices heretofore employed.

The principal object of my invention is the provision of improved methods and means for fitting piston pins to worn connecting rods and pistons.

Another object is the provision of apparatus by means of which a new set of oversize piston pins may be assembled with connecting rods and pistons accurately and in a relatively short space of time.

Another object is the provision of improved apparatus for controlling the operation of a cutting tool such as is employed for reaming or boring operations.

Other objects and features of my invention will be apparent from a consideration of the following detailed description taken with the accompanying drawings, wherein Fig. 1 is an elevational view showing the apparatus of my invention as it is utilized in the reaming of an upper connecting rod bearing.

Fig. 2 is an enlarged fragmentary sectional view partly in elevation, taken on the line 2—2 of Fig. 1.

Fig. 3 is a sectional view taken on the line 3—3 of Fig. 2 showing a detail of a piston rod clamping device.

Fig. 4 is a fragmentary elevational view partly in section taken at right angles to Fig. 3 and illustrating a detail thereof.

Fig. 5 is an enlarged fragmentary sectional view partly in elevation showing a detail of the bearing arrangement for the main supporting member.

Fig. 6 is an enlarged fragmentary sectional view partly in elevation, taken slightly in front of the section line 2—2, but showing the equipment employed for operating on the piston, the true section line of Fig. 6 being irregular but taken along the line 6—6 of Fig. 7, and Fig. 7 is an irregular but generally plan sectional view partly in elevation taken along the line 7—7 of Fig. 6.

In general, I accomplish the objects of my invention, insofar as it applies to fitting of piston pins, by supporting the cutting tool, which may be a reamer or borer, with its axis in a predetermined position, and then support the connecting rod with the axis of its lower bearing in parallel alignment with the axis of the cutting tool, but in such a way as to permit absolutely free movement of the connecting rod in any way and in all directions except that no movement is permitted which will permit disturbing the parallel alignment between the lower connecting rod bearing and the axis of the cutting tool. Holding the connecting rod bearing in this position, it is readily reamed or tooled with the cutting tool so as to produce a finished inside bearing surface, the central axis of which is directly in alignment with the lower bearing of the connecting rod. Thus, the new bearing surface is produced without consideration of and unaffected by inaccuracies in the worn bearing surface caused either by wear or by a "springing" of the connecting rod resulting from the relief of strain in the metal itself. I then have an absolutely true piston pin bearing surface in the connecting rod and it is unnecessary to "jig" or bend the rod in any way as has been the old practice, because I produce my proper alignment by the very act of producing the new bearing surface. Then, employing the same equipment, with the exception of different means for supporting the piston, I mount the piston so that the vertical axis of the piston pin is directly at right angles to the axis of the cutting tool and the axis of the piston pin openings of the piston is generally in direct alignment with the axis of the cutting tool. The piston is then tooled with the same tool employed for tooling the connecting rod wrist pin bearing, free movement of the piston being permitted, except movement such as would disturb the previously established alignment described hereinabove. By this means, it is impossible for the axis of the piston pin openings to be at any angle except a true right angle to the true vertical axis of the piston itself. It may be possible, however, that the new piston pin bearing surfaces in the piston will be so placed that the center of the wrist pin is a fraction higher or lower than in the original installation, but this difference, if it should occur, is so exceedingly slight that it will have no detectable effect upon the operation of the engine by changing the compression ratio or anything of the kind. By proceeding in this manner, employing a reamer of the type described in my prior Patents 1,902,062 and 1,989,476, a finished bearing surface is very quickly and readily provided in both the connecting rod piston pin bearing and piston, so that, in a fraction of the time heretofore required for refitting oversize piston pins, I can accomplish a much improved result without any possibility of any of the critical surfaces being out of alignment in the slightest way, the result being that, in so far as the operation of the engine is concerned, the piston pins and piston pin bearings will function equally as well if not better than in a new engine.

The apparatus preferably employed includes the features shown in the embodiment illustrated in the accompanying drawings. In general, however, I provide a suitable rugged main frame capable of functioning as a firm support for the equipment mounted thereon. A cutting tool, such as a reamer and operating parts therefor, is mounted on the frame so that the axis of the cutting tool occupies a fixed position at all times. I then provide an extending support in the form of a shaft in true parallel alignment with but spaced a considerable distance from the cutting tool. By a series of supports, each in parallel alignment with the axis of the cutting tool and each other, I so mount the connecting rod, using the lower bearing thereof, that the axis of the lower bearing is in parallel alignment with the cutting tool. Employing anti-friction bearings throughout to facilitate the free movement required for fully successful operation, the connecting rod is free to move in any direction except a direction which would take the axis of its lower bearing out of parallel alignment with the axis of the cutting tool. In this way, free movement is permitted so that the connecting rod can be moved in a plane at right angles to the axis of the cutting tool to facilitate adjustment for different lengths of rods, and the rod and its supporting mechanism as a whole is free to move longitudinally of the cutting tool as required for the necessary tooling operation. I also employ counterbalances so that there is no free suspended weight and it is impossible to place any strain on any of the parts which might tend to interfere with the free cutting action of the cutting tool. I provide a separate supporting yoke for the piston, so that the piston can be mounted in substantially the same way as described in connection with the connecting rod, but, in the case of the piston, I utilize the upper surface thereof for the purpose of producing the alignment required.

Before proceeding to a detailed description of the embodiment of my invention illustrated in the drawings, I wish to state that by a cutting tool I mean a reamer or boring tool or similar tool which is capable of use for the purpose of producing a circular bearing surface of the type with which my invention is concerned, and also where I refer to anti-friction bearings I mean to include bearings of the roller bearing or ball bearing type or modifications thereof in which the bearing principle is not the mere sliding of one flat surface on another.

Referring now to the drawings, I provide a main frame 10 including legs 11 for supporting the entire mechanism rigidly on the floor. Mounted on top of the frame is a housing 12 containing a source of power and speed changing mechanism (not shown) for driving a tool 13. A switch handle 14 is provided having a plurality of positions for controlling the speed at which the tool revolves. A drive shaft 16 projects from the housing 12 and carries a chuck 17 in which the tool 13 is adapted to be secured.

While the tool 13 may comprise any suitable cutting tool of the character referred to generally hereinabove, I preferably utilize an adjustable reamer made in accordance with the general disclosures of my prior Patents No. 1,902,062 and No. 1,989,476 and utilizing the general adjustment features embraced within the claims of Habart Patent No. 1,611,186, assigned to the same assignee as my own reamer patents identified immediately hereinabove.

Secured to the frame 10 is a supporting shaft 18, this supporting shaft 18 being held in rigid and non-rotatable position in alignment with the axis of shaft 16 and the axis of the reamer 13. The main support shaft 18 is provided with a groove 19, and a supporting arm 21, slidable longitudinally of the supporting shaft 18, is provided with a key 22 engaging in the groove 19 thereby preventing the supporting arm 21 from rotating with respect to the shaft 18. The upper end of the arm 21 carries a centering pin 23 which engages in a center end bearing recess in reamer 13 whereby to facilitate maintaining the true axial alignment of reamer 13. The end of the supporting arm 21 is slit between a pair of bosses 24 and 26 through which a screw 27 is threaded, the screw 27 being provided with a handle 28 whereby the arm 21 may be locked in position on the shaft 18 after the pin 23 is brought into engagement with the reamer.

The shaft 18 also supports rocking frame or arbor 29 provided with a counterbalance 31, an anti-friction bearing support being provided for the rocking frame or arbor 29 on the shaft 18. The arbor 29 comprises the main support for the apparatus employed to support and position the equipment which is to be tooled. As shown in Fig. 5, I provide a pair of roller bearings 32 so that while the arbor 29 is at all times fixed with respect to the axis of the shaft 18, at the same time it is free to swivel, with the application of only very light pressure within the limits desired, about the shaft 18. The advantages and results flowing from this arrangement will be made clear as the description progresses.

The upper end of the arbor 29 is provided with a pair of extending arms 33 and 34, each provided with an anti-friction bearing and carrying a rotatable shaft 36 in true parallel alignment with the main supporting shaft 18 and also in true parallel alignment with the axis of the reamer 13. The bearing 37, shown in Fig. 7, is carried by the arm 34 and is sufficiently illustrative of the construction, it being understood that the bearing provided in the arm 33 for the shaft 36 is of similar or identical construction. Thus it will be seen that shaft 36 is also free to rotate by the application of only a very slight pressure on equipment carried by this shaft, but the shaft will still be maintained in the established parallel relation with the reamer 13 as previously described.

Carried on shaft 36 and free to move longitudinally thereof is a specially designed carriage 39, this carriage being provided at both ends thereof with a plurality of rollers, the arrangement of rollers on each end being the same. Looking at Fig. 2, rollers 41 and 42 are fixed but rotatably mounted on stub shafts provided for the purpose. Roller 43 is carried on an arm 44 pivoted to the carriage 39 at 46, and urged by spring pressure of spring 47 in a direction so as to bring the roller 43 into firm contact with the surface of shaft 36. Because of the arrangement of three rollers in each of the sets at each end of the carriage 39, each of these rollers is, therefore, held in firm but rolling contact with the shaft 36. By this arrangement the carriage 39 is free to move with little effort longitudinally of shaft 36, but is not readily rotated with respect to shaft 36. In so far as rotatory movement is concerned where the operation of the apparatus requires such movement, it will be remembered that the shaft 36 is freely rotatable and, therefore, it is sufficient to state that this roller construction is the same at both ends of the carriage.

The carriage 39 is provided with an upwardly extending arm having a boss 48 which carries a stub shaft 49 utilized, in the manner to be described, for mounting the work thereon. The shaft 49 is keyed, splined or otherwise non-rotatably supported in the boss 48. This stub shaft 49 is also in parallel relationship with the axis of the reamer 13 and, therefore, also in parallel relationship with shafts 36 and 18. The portion of the equipment thus far described comprises the main supporting structure utilized with special clamping devices, as will be described, for supporting either connecting rods, pistons or other pieces of equipment which comprise the object on which work is to be performed by the cutting tool. It is at once seen that by the provision of the stub shaft 49 to which the work is clamped, coupled with the arbor 29 and associated apparatus, work may be so supported with respect to shaft 49 that it will be freely moved longitudinally of the cutting tool, or in a position in a vertical plane perpendicular to the axis of the cutting tool, but at all times the work will be so held with respect to the axis of the cutting tool that it will be impossible to get it out of alignment.

I shall now describe the invention as it applies to operation on the conventional style of connecting rod employed in internal combustion engines. The connecting rod 51 is provided with an upper bearing 52, the bearing which engages the usual wrist pin or piston pin. The lower part of the connecting rod is also provided with a bearing, and has a lower bearing cap 53 removable from the connecting rod, but normally secured thereto so as to complete the lower bearing by means of cap screws 54. As illustrated in Fig. 2 I support the lower connection rod bearing so as to place this bearing in true parallel alignment with stub shaft 49 and also, therefore, in alignment with the axis of reaming tool 13. The manner in which this support is accomplished is as follows:

A bracket member 56 has an arm 57 provided with an opening which just snugly fits over stub shaft 49, and has a smaller hole through which a pin 58, carried by the boss 48, engages to fix the position of the clamping member 56 and prevent its rotation with respect to shaft 49 when it is in position thereon. The clamping member 56 also has pivoted thereto at 59 a clamping arm 61 provided with an arcuate end portion adapted to engage against stub shaft 49. The corresponding surfaces where the arm 57 and the clamping arm 61 engage shaft 49 are equal distances from a center line drawn through the clamping member perpendicular to clamping screw 62 so that when the clamping screw is tightened up in a manner to be described it will occupy a position with its axis vertical to the axis of shaft 49. The clamping screw 62 is threaded in a central boss provided in the clamping member 56 and carries at its lower end a cross member 63. This cross member is rotatable with respect to the clamping screw 62, but carries a pin 64 which slides in the clamping member 56 and prevents rotation of the cross member 63. At either end of cross member 63, clamps 66 and 67 are pivoted, these clamps having hook-like end portions adapted to engage under the shoulder provided on the upper bearing cap of the connecting rod. A spring 68 is provided at each end of the cross member 63 so as normally to urge the clamps 66 and 67 into clamping relation with respect to the connecting rod thereby facilitating assembly.

It is, of course, known that the bearings of connecting rods are of various sizes adapted to engage crank shafts of different diameters. Since the stub shaft 49 is preferably fixed in the boss 48 I utilize a special liner 69 for compensating for difference in diameters of lower connecting rod bearings. A number of liners 69 are provided but each one always has such an inside surface that it engages snugly against the stub shaft 49, but the outer surface varies so as to accommodate different size connecting rods. In the drawings I show the lower bearing cap in position, but in general the connecting rod may be supported just as well by removing the lower bearing cap entirely. However, since it is unnecessary to remove the lower bearing cap and when connecting rods are received for the refitting of piston pins the lower bearing cap is usually found assembled with its particular connecting rod, I show in the drawings the set up which will usually occur when the tool is actually employed. The clamping screw 62 is provided with a suitable handpiece 71 to facilitate operation. I shall describe the matter of reaming the upper connecting rod bearing after I have described the structural arragement employed for supporting the pistons.

In operating on the piston, I proceed on the basis that if the piston, the plane of which is or should be in true parallel alignment with the axis of the piston pin opening, be supported in alignment with the shaft 49 and, therefore, in alignment with the reamer 13, a true wrist pin bearing surface will be cut even though the wrist pin openings in the worn piston are out of line, are slightly oblong or are burred, scored, or otherwise in such condition that in ordinary operations the tendency of the cutting tool would be to follow the worn opening and produce a piston pin opening which is somewhat out of line.

For supporting the piston, therefore, I utilize a mounting bracket 73 having a portion 74 which snugly but slidably engages over the stub shaft 49. The portion 74 is recessed to receive the pin 58 carried by the boss 48, thereby positioning the mounting bracket 73 and tending to prevent rotation thereof with respect to stub shaft 49. The periphery of the portion 74, however, is split and a pair of bosses 76 and 77 are provided through which a tightening bolt is threaded for the purpose of clamping the mounting bracket 73 rigidly in place. A handle 78 is provided for the purpose.

The piston engages with its head against the flat surface of a mounting plate 79, this mounting plate having secured in its center a supporting shaft 81. An anti-friction bearing 82 preferably of the double ball bearing type is positioned between shaft 81 and the inside cylindrical surface of member 73. A pair of clamping rods 83 and 84 are secured at opposite sides of the mounting plate 79 near the periphery thereof, and these clamping rods have secured to the opposite ends thereof a yoke 84. Clamping screw 86 is threaded in a center boss provided in the yoke 84 and carries on the inner end thereof a swivel clamping bar 87. The clamping screw 86 is provided with a suitable handle 88. Thus, it will be seen that by accurate alignment of parts maintaining the parallelism previously referred to, I may mount the piston 89 with relationship to the stub shaft 49 so that the axis of the piston pin opening in the piston will be in line with the axis of the cutting tool. Truly, the entire clamping assembly and the piston carried thereby can be rotated with respect to the mounting bracket 73 in the specific embodiment shown. Certain functional advantages are obtainable by this specific arrangement as will be explained in connection with the operation of the device as a whole.

It will be seen that because of the fact that the entire assembly supporting the piston projects out beyond the stub shaft 49, there will be a tendency for the resulting unbalanced weight to cause a pivotal action about the axis of shaft 36 with the result that this shaft would tend to rotate in a clockwise direction. I provide a simple counter balance arrangement, however, clearly shown in Fig. 6. On the carriage, I provide a cup-shaped spring housing 91 cooperating with a telescoping tubular member 92 also functioning as a spring housing and between these two members supporting a spring 93. The end of the member 92 is bifurcated to receive a roller 94 adapted to run along a flange 96 formed on the frame of member 29. The upper edge of the flange 96 where it is engaged by roller 94 is parallel with the axis of shaft 36. The strength of the spring 93 is such that the weight of the piston and associated clamping mechanism is resiliently and in a balanced manner carried by the main frame member 29 thereby preventing the weight of the piston and associated clamping mechanism from bearing heavily against the cutting tool.

The reamer employed, as previously noted, is preferably of the general type described in my prior Patent No. 1,989,476. The cutting segments 97 are adjustable to vary the effective diameter of the reamer, adjustment being made by placing a wrench at the end 98 of the reamer provided for the purpose. This reamer is also adapted to carry a tapered sleeve 99, utilizable in the operation of reaming the piston in a manner to be described in connection with the operation of the device.

The principles upon which the apparatus of my invention functions have been described hereinabove, and in general the operation of the apparatus should be clear from the preceding description. For the benefit of those skilled in the art, however, I shall describe a typical operation for fitting a new set of oversize piston pins into the worn pistons and associated connecting rods.

The operator first determines from an inspection of the pistons and connecting rods the proper size of the new wrist pins which are to be employed. He then mounts the reamer in the chuck and, by means of a suitable gauge, sets the reamer to slightly less diameter than the diameter of the new pins. He then mounts the connecting rod clamping mechanism in place on the stub shaft 49, and, using the proper liner 69, mounts one of the connecting rods in the general position shown in Fig. 2. The upper bearing of the connecting rod is then slid over the reamer but still not in contact with the cutting segments thereof. The arm 21 is then moved forwardly until the centering pin 23 engages the reamer so as to hold the reamer in true parallel relation with the shaft 36. Keeping in mind that the connecting rod is moved by rolling the carriage 39 along the shaft 36, the next operation is then to move the connecting rod and its entire assembly, including the carriage 39, forwardly so that the upper connecting rod bearing is reamed to the size for which the reamer is set, namely, slightly smaller than the final size which will be required. This operation reams the piston pin bearing in the connecting rod in the exact alignment required whether the old opening is oval, out of alignment or scored, and even though a relatively heavy cut must be taken to bring it to the size intended. This occurs because the lower bearing upon which the operator is working must be by virtue of the arrangement of parts of the machine in true alignment with the axis of the reamer. Since the parts are balanced by the use of counter weights and since all parts move very smoothly and easily because of the use of anti-friction bearings, it is impossible for the reamer to cut unevenly as would be the case unless the connecting rod were truly guided in a straight line. While the connecting rod is freely movable in all respects required to bring it, without effort, to the cutting tool, it is effectually prevented from being disturbed in the single direction which must be kept true, namely, in a direction in which it has rotary or canting movement with respect to the axis of the reamer.

When the connecting rod has been run through the reamer and returned, it can either be given a finishing cut immediately in order to fit the pin thereto, or preferably the operation is repeated on each of the connecting rods so that the entire set employed in a given engine is first roughed in, leaving only a very small amount of metal, say on the order of .0025 to .005 of an inch to be removed. Since the principal difficulty in a reaming operation of this kind is to establish a true alignment of the piston pin bearing independent of wear, the final finishing operation can be performed usually without possibility of mishap without the use of any special precautions for maintaining the alignment; that is to say, the final thin cut which the operator takes in fitting the piston pin can be made quickly if the individual pins are fitted without mounting the rods in the clamping device. If more than just a very small amount of metal, however, is to be removed it is preferable that the pin be fitted in each case while the rod is mounted on the machine. In order to fit the pin to the rod it is only necessary to slide back the arm 21, move the rod back a short distance by rolling the carriage on the rod 36 and testing the fit by actual trial.

After the connecting rods have been reamed, the connecting rod mounting bracket is removed from the stub shaft 49, and the piston mounting bracket 73 secured in its place. A piston is then placed with its head against the mounting plate 79, care being taken that the piston head is sufficiently clean so that carbon or other foreign matter will not interfere with the alignment. When reaming the piston, it is unnecessary to employ the arm 21, for reasons which will be made clear. The important dimension to maintain in the piston is from the center of the piston pin opening to the top edge of the piston; that is to say, the dimension indicated by the dotted line a in Fig. 6. If this dimension is the same on each side of the piston the piston will line up properly in the cylinder when it has been assembled with the new pin. Because of the manner in which the piston is clamped it is obvious that this dimension is bound to be uniform. I have found that in the reaming of pistons the most convenient procedure is to ream the opening provided in one side of the piston wall, and then to rotate the piston and ream the opening in the opposite piston wall. After the piston has been mounted in position the entire supporting carriage is moved forward to cause the end of the reamer to be inserted through the piston pin opening in the piston, and then the tapered centering sleeve 99 is brought into position so as to be inserted slightly within one piston pin opening as shown in Figure 7. This facilitates supporting the piston against rotation about the bearing 82, although obviously it performs no major function in so far as maintaining true parallel alignment is concerned. When the reamer is unsupported at its outer end, the outer end tends to wobble slightly so as to describe a small circle. Nevertheless, this does not in any way affect the operation on the piston because since all of the parts are smoothly balanced and easily moved, a gentle rocking motion occurs so that the piston and entire supporting assembly moves very slightly as the reamer is rotated. When the reamer has passed through one side of the piston, the piston is withdrawn, rotated 180 degrees and the operation is repeated for the other side of the piston. In finishing the pistons the same procedure may be followed as in the reaming of the connecting rods, namely, all of the pistons may first be roughed in and then all finished or, if desired, each individual piston may be finished so as to fit the rod thereto while it is mounted in the machine. I have reamed a relatively large number of pistons following the method described hereinabove, and in all cases I find the axis of the piston pin opening in true parallel alignment with the top face of the piston, and in all cases, notwithstanding the fact that the two sides of the piston are reamed separately, these two sides are also accurately in line as can be determined by sliding a pin completely through the piston when the pin has a snug but sliding fit.

In connection with the use of my invention, I wish to call attention to the fact that normally a reamer tends to cut in line with the hole in which it is inserted. For this reason, when a worn bearing surface is reamed to produce a truly circular opening, that opening nevertheless will be usually out of line if the original opening was out of line. If a heavy cut be taken, the tendency becomes still more pronounced. By following my invention, however, whatever the condition of the worn surface may be, the hole is reamed in true alignment, preferably as described, a "roughed in" surface allowing for a final thin cut to produce a proper fit. Since the roughed in surface, however, is now truly in line, in the final thin cut, the reamer will follow the hole and produce a truly aligned bearing surface. For this reason, the final cut can be made without clamping the connecting rod or piston, or other piece of equipment on the machine, although equally good results may be obtained if this procedure be followed.

I am aware that the material of which the connecting rod bearings and pistons are fabricated has a great deal to do with the fitting of the piston pins. For example, because of the use of certain materials, piston pins sometimes must have a driving fit and at other times can be fit so that the pins can be pushed into place by hand. When I describe the method of fitting a set of pins, however, it is to be understood that the method is only illustrative, it being required that the operator take into consideration the character of the work which he is performing and the nature of the materials used.

While my invention is primarily concerned with reaming operations as performed on connecting rods and pistons for the purpose of fitting new and oversize pins thereto, it is to be understood that the apparatus may have other uses and may be employed for the purpose of fitting work to any cutting tool wherein a truly aligned circular internal surface is to be produced. The expression "cutting tool" as used in the claims, therefore, is to be interpreted as covering any device for removing metal as in reaming, dressing and finishing operations.

What I claim as new and desire to protect by Letters Patent of the United States is:

1. Apparatus of the character described, comprising a main frame, a cutting tool supported on said frame having its axis substantially horizontal, a main mounting shaft supported by the main frame and having its axis parallel to the axis of the cutting tool, an arbor rotatably carried on said main shaft, a rotatable shaft carried by the arbor in parallel alignment with first mentioned main mounting shaft, and means freely movable along said rotatable shaft for supporting an article on which work is to be performed, said arbor having a counterbalance for balancing the weight of said rotatable shaft and equipment carried thereby.

2. Apparatus of the character described, comprising a main frame, a cutting tool supported on said frame having its axis substantially horizontal, a main mounting shaft supported by the main frame and having its axis parallel to the axis of the cutting tool, an arbor rotatably carried on said main shaft, a rotatable shaft carried by the arbor in parallel alignment with first mentioned main mounting shaft, and means freely movable along said rotatable shaft for supporting an article on which work is to be performed, said arbor having a counterbalance for balancing the weight of said rotatable shaft and equipment carried thereby, all moving members including said arbor and rotatable shaft being provided with anti-friction bearings.

3. Apparatus of the character described, comprising a main frame, a drive mechanism for a cutting tool support on said main frame, a cutting tool mounted to be driven by said driving mechanism and having its axis in a substantially horizontal plane, a main mounting shaft carried by said frame in parallel alignment with the axis of said cutting tool, a non-rotatable arm slidable longitudinally of said main supporting shaft provided with means for engaging and supporting the cutting tool whereby to facilitate maintaining alignment thereof, a balanced arbor rotatably supported on said main support shaft, a rotatable shaft carried by the arbor and disposed parallel to the axis of the cutting tool, and work supporting mechanism freely movable longitudinally of said rotatable shaft.

4. Apparatus as defined in claim 3 wherein said work supporting mechanism comprises a carriage having rollers engaging said rotatable shaft so as to roll longitudinally thereof, and a stub shaft having its axis in alignment with said rotatable shaft.

5. Apparatus as defined in claim 3 wherein said work supporting mechanism comprises a carriage having rollers engaging said rotatable shaft so as to roll longitudinally thereof, a stub shaft having its axis in alignment with said rotatable shaft, and a clamping device non-rotatably supported on said stub shaft and provided with clamps which engage a connecting rod so as to support the lower bearing thereof so that its axis is in alignment with the axis of said stub shaft.

6. Apparatus as defined in claim 3 wherein said work supporting mechanism comprises a carriage having rollers engaging said rotatable shaft so as to roll longitudinally thereof, and a stub shaft having its axis in alignment with said rotatable shaft, said stub shaft being adapted to support non-rotatably thereon either a clamping device provided with clamps which engage a connecting rod so as to support the lower bearing thereof so that its axis is in alignment with the axis of said stub shaft, or a mounting bracket carrying a piston clamping mechanism, said piston clamping mechanism being designed to support the piston with the plane of its head parallel to the axis of said stub shaft.

7. Apparatus of the character described, comprising a main frame, a drive mechanism for a cutting tool support on said main frame, a cutting tool mounted to be driven by said driving mechanism and having its axis in a substantially horizontal plane, a main mounting shaft carried by said frame in parallel alignment with the axis of said cutting tool, a non-rotatable arm slidable longitudinally of said main supporting shaft provided with means for engaging and supporting the cutting tool whereby to facilitate maintaining alignment thereof, a balanced arbor rotatably supported on said main support shaft, a rotatable shaft carried by the arbor and disposed parallel to the axis of the cutting tool, work supporting mechanism freely movable longitudinally of said rotatable shaft, said work supporting mechanism comprising a carriage having rollers engaging said rotatable shaft so as to roll longitudinally thereof, a stub shaft having its axis in alignment with said rotatable shaft, a clamping device non-rotatably supported on said stub shaft and provided with clamps which engage a connecting rod so as to support the lower bearing thereof so that its axis is in alignment with the axis of said stub shaft, said stub shaft also being adapted to support a piston, and separate means for resiliently supporting the overhanging weight of such piston and the mounting mechanism therefor whereby to prevent such weight from being supported by the cutting tool.

8. Apparatus of the character described comprising a main frame, a reamer driving mechanism carried by the frame, a reamer having adjustable cutting segments carried by said reamer driving mechanism with its axis in a substantially horizontal position, a main support shaft carried by the frame in parallel alignment with the axis of the reamer, means carried by said main support shaft for engaging a free end of the reamer to support and guide the same, an arbor having a counterweight rotatably carried on said main shaft through anti-friction bearing members, said arbor having a pair of projecting arms, a rotatable shaft supported in anti-friction bearings carried by said arms, said rotatable shaft being parallel to the axis of said reamer, a carriage having a plurality of rollers engaging said rotatable shaft so as to be freely movable longitudinally thereof, a stub shaft carried by said carriage having its axis parallel to the axis of the reamer, and means for supporting the lower end of a connecting rod on said stub shaft so that the axis of the lower connecting rod bearing is in parallel relation to the axis of said stub shaft and the axis of the reamer.

9. Apparatus of the character described comprising a main frame, a reamer driving mechanism carried by the frame, a reamer having adjustable cutting segments carried by said reamer driving mechanism with its axis in a substantially horizontal position, a main support shaft carried by the frame in parallel alignment with the axis of the reamer, means carried by said main support shaft for engaging a free end of the reamer to support and guide the same, an arbor having a counterweight rotatably carried on said main shaft through anti-friction bearing members, said arbor having a pair of projecting arms, a rotatable shaft supported in anti-friction bearings carried by said arms, said rotatable shaft being parallel to the axis of said reamer, a carriage having a plurality of rollers engaging said rotatable shaft so as to be freely movable longitudinally thereof, a stub shaft carried by said carriage having its axis parallel to the axis of the reamer, a resiliently carried roller supported by said carriage, said roller adapted to roll along a surface of said arbor parallel with the axis of said rotatable shaft, and means for mounting a piston on said carriage with the surface of the piston head parallel with the axis of said stub shaft.

WILLIAM H. EVANS.